J. J. COYNE & D. R. LLEWELLYN.
OIL BUSHING AND PACKING RING.
APPLICATION FILED MAR. 17, 1910.
968,132.
Patented Aug. 23, 1910.
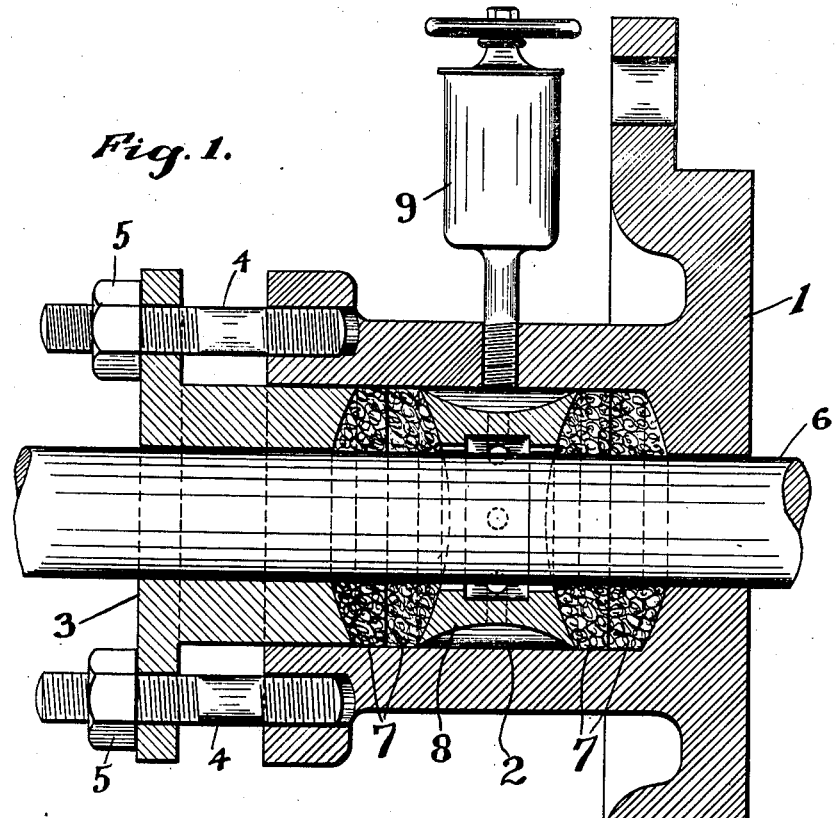
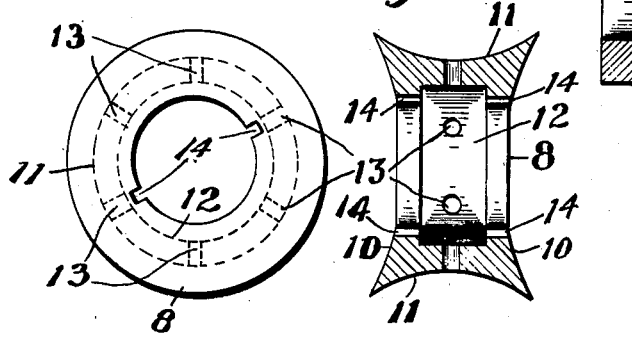
Witnesses
S. H. Loftus.
R. V. Krenkel.
Inventors
James J. Coyne
David R. Llewellyn
By Joshua R. H. Potts.
Attorney

UNITED STATES PATENT OFFICE.

JAMES J. COYNE AND DAVID R. LLEWELLYN, OF SHAMOKIN, PENNSYLVANIA.

OIL-BUSHING AND PACKING-RING.

968,132.  Specification of Letters Patent.  Patented Aug. 23, 1910.

Application filed March 17, 1910. Serial No. 549,822.

*To all whom it may concern:*

Be it known that we, JAMES J. COYNE and DAVID R. LLEWELLYN, citizens of the United States, residing at Shamokin, county of Northumberland, and State of Pennsylvania, have invented certain new and useful Improvements in Oil-Bushings and Packing-Rings, of which the following is a specification.

Our invention relates to improvements in oil bushings and packing rings, the object of the invention being to provide a device of this character, which may be positioned in any ordinary stuffing box on a piston rod, plunger or other similar device in which a packing is employed to thoroughly distribute lubricant to the piston rod or plunger rod, to maintain the latter thoroughly lubricated, yet perfectly tight.

With these and other objects in view, the invention consists in certain novel features of construction, and combinations and arrangements of parts as will be more fully hereinafter described and pointed out in the claims.

In the accompanying drawings: Figure 1, is a view in longitudinal section through a gland and stuffing box, illustrating our improvements. Fig. 2, is an end view of the ring or bushing, and Fig. 3, is a view in cross section of Fig. 2.

1, represents a cylinder head, 2, a stuffing box, 3, a gland, and 4, bolts on which nuts 5, are provided, securing the gland in the end of the stuffing box.

6, is a piston rod or plunger rod, mounted to reciprocate in the bushing, and around which packing rings 7, are located to make the stuffing box tight. Between these rings 7, 7, our improved ring or bushing 8, is located in line with an oil cup 9, feeding oil through an opening in the bushing onto the periphery of ring 8. Ring 8, has opposite concaved sides 10, 10, and a concave periphery 11. The ring is formed with an internal chamber 12, and the ring is provided with a circular series of radial openings 13, through which the lubricant from cup 9, finds its way into chamber 12. The ring has a central opening to accommodate rod 6, and is provided with opposed, transverse notches or recesses 14, through which the lubricant finds its way to packing rings 7.

By reason of the concaved periphery of the ring 8, an annular chamber is provided around the ring, between the same and the stuffing box 2, so that the lubricant from cup 9, will pass around the ring, and through the several openings 13, into the chamber 12, into contact with rod 6, and thence through the notches or recesses 14, to the packing ring 7.

It will be noted in Fig. 1, that the inner end of stuffing box 2, and the inner end of gland 3, are concaved, and this is the usual form of stuffing boxes and glands in general use.

It will further be noted that the ring 8, is concaved in opposite sides, and positioned between the packing rings 7, so that between the ring 8, and the end of stuffing box 2, the packing rings will be confined between two concaved surfaces, and between the ring 8, and the gland 3, the packing ring 7, will be confined between two concaved surfaces. Hence when the gland 3, is forced inward, the packing rings 7, at both sides of ring 8, will be compressed around the piston rod 6, which is one of the features of our improved ring.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention what we claim as new and desire to secure by Letters Patent is:

1. A device of the character described, comprising a ring having a central rod receiving opening, said ring concaved at its opposite sides and concaved peripherally, said ring having a central annular chamber, a series of radial openings through said ring communicating with said chamber, and notches or grooves in the inner face of said ring communicating with said central opening, substantially as described.

2. The combination with a stuffing box, having an inner concaved end, a gland in the end of the stuffing box having a concaved inner end, and a rod extending through the stuffing box and gland, of a ring midway between the ends of the stuffing box, located around the rod and concaved peripherally, an oil cup supplying lubricant to the interior of the stuffing box at the periphery of the ring, said ring having an annular chamber therein around the rod, radial openings and transverse notches or recesses, said ring having its opposite sides concaved and packing rings between the first mentioned ring, and end of the stuffing boxes, and between the first mentioned ring and the gland, substantially as described.

In testimony whereof we have signed our names to this specification in the presence of two subscribing witnesses.

JAMES J. COYNE.
DAVID R. LLEWELLYN.

Witnesses:
JAMES A. LEAVENS,
MICHAEL BURNS.